United States Patent [19]
Rendle

[11] 3,939,557
[45] Feb. 24, 1976

[54] METHOD OF MAKING RESISTANCE THERMOMETER SENSORS

[75] Inventor: Kenneth George Rendle, Bognor Regis, England

[73] Assignee: Rosemount Engineering Company Limited, Bognor Regis, England

[22] Filed: Jan. 9, 1975

[21] Appl. No.: 539,576

[30] Foreign Application Priority Data
Feb. 19, 1974 United Kingdom.................. 7521/74

[52] U.S. Cl................... 29/612; 29/593; 29/610 R; 29/613; 338/25; 338/264; 338/275; 338/302
[51] Int. Cl.²...................... H01C 7/02; H01C 7/04
[58] Field of Search ............ 29/612, 610, 613, 620, 29/593; 338/25, 28, 229, 263, 264, 265, 269, 273, 275, 295, 301, 302; 73/362 AR

[56] References Cited
UNITED STATES PATENTS

| | | |
|---|---|---|
| 2,802,925 | 8/1957 | VonSeelen et al.................... 338/28 |
| 2,990,529 | 6/1961 | Courtney-Pratt..................... 338/25 |
| 3,114,125 | 12/1963 | Werner et al......................... 338/28 |
| 3,441,893 | 4/1969 | Gordon et al...................... 338/25 X |
| 3,781,749 | 12/1973 | Iles et al. ............................. 29/612 X |
| 3,845,443 | 10/1974 | Fisher.................................... 338/25 |
| 3,889,362 | 6/1975 | Tyler.................................... 29/612 |

FOREIGN PATENTS OR APPLICATIONS

| | | |
|---|---|---|
| 1,529,701 | 5/1968 | France................................. 338/25 |

*Primary Examiner*—Victor A. DiPalma
*Attorney, Agent, or Firm*—Dugger, Johnson & Westman

[57] ABSTRACT

A resistance thermometer sensor is provided by forming a path of electrically conducting material secured on an insulating base. The path is shaped as a loop having two side-by-side portions. A shorting bar connecting across these portions to short circuit part of the loop is adjusted along their length to trim the ice point resistance of the sensor as required. When suitably adjusted, the shorting bar is fastened in position, for example by welding. In one example, the sensor comprises a bifilar helix of resistance wire wound and secured on a cylindrical former.

10 Claims, 4 Drawing Figures

U.S. Patent  Feb. 24, 1976  3,939,557
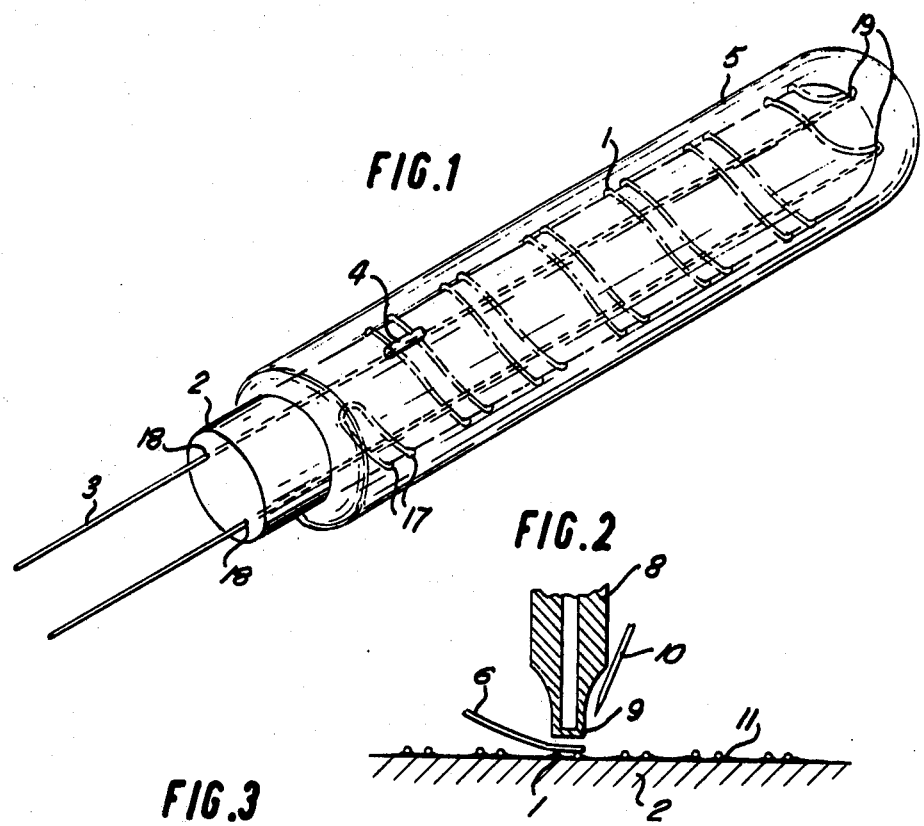
FIG.1
FIG.2
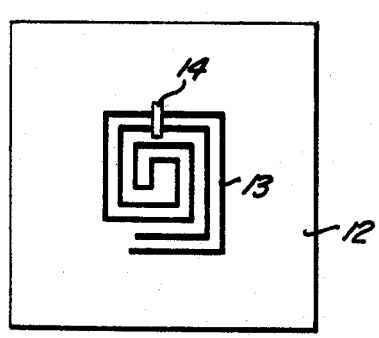
FIG.3
FIG.4

METHOD OF MAKING RESISTANCE THERMOMETER SENSORS

This invention relates to resistance thermometer sensors.

One of the problems encountered when manufacturing resistance thermometer sensors is the difficulty of trimming such sensors to have a desired value of electrical resistance at a particular temperature.

It will be understood that it is often desirable to have resistance thermometer sensors with substantially identical performance specifications to avoid the necessity of re-calibrating the temperature measuring equipment using the sensors when one sensor is exchanged for another of the same specification. To provide sensors with similar specifications it is necessary on the one hand to ensure that the sensors have similar temperature co-efficients of resistance and also that the resistances of all the sensors at a reference temperature are substantially equal. Typically, the reference temperature used is that of melting ice, i.e. 0°C, and the resistance of a sensor at this temperature is referred to as the ice point resistance.

There are numerous ways known for providing electrically conducting paths of materials with predetermined temperature co-efficients of resistance. However, the present invention is concerned more particularly with trimming the electrically conducting paths of resistance thermometer sensors to have a desired ice point resistance.

The specification of U.S. Pat. No. 3114125 to Werner et al includes disclosure of a method of manufacturing a temperature sensor in which a helical resistance wire of predetermined resistance is housed in a bore or bores in a ceramic tube. The ceramic tube of the sensor is formed with an opening at one side extending into the bore and the sensor is trimmed by withdrawing part of the resistance wire through the bore to reduce the effective length of the wire between connecting leads for the sensor until the resistance of the sensor is at a required value.

In the complete specification of British Pat. No. 1025501 to Rosemount Engineering Co. Ltd. et al, a similar method of manufacturing a resistance thermometer sensor is disclosed. In this method however a part of the resistance wire at a point intermediate its ends is withdrawn through an opening extending into the bore and twisting the loop so withdrawn to short circuit the loop, the withdrawing and twisting being continued until the resistance of the wire measured between its ends reaches the required value for the temperature which the operation is carried out.

Clearly, both of the aforementioned trimming methods involves mechanically stressing a resistance wire used in the sensor. This mechanical stressing introduces strains in the wire which cause variations in the observed resistance of the sensor, thereby making trimming of the sensor possible only to a limited degree of accuracy. Also, the trimming methods described above will require considerable dexterity, especially when applied to sensors of small size.

According to one aspect of the present invention there is provided a resistance thermometer sensor comprising a base of insulating material, a path of electrically conducting material with a temperature responsive co-efficient of resistance, the path being firmly attached to said base and at least a part of the length of the path having the configuration of a loop with two portions in side by side relationship, and a shorting bar connected across said two portions at a predetermined position along the length of the portions to provide a desired value of ice point resistance for the sensor.

During the manufacture of such a resistance thermometer sensor, the resistance of the sensor measured between the ends of the path when the thermometer is held at a predetermined constant temperature can be adjusted by suitable positioning of the shorting bar along the length of said two portions of the loop. Clearly, the resistance of the sensor can be adjusted by the amount of the resistance of the largest lengths of the path in the loop that can be shorted out by the shorting bar.

According to another aspect of the present invention there is provided a method of making a resistance thermometer sensor comprising the steps of providing a base of insulating material and, firmly attached thereto, a path of electrically conducting material with a temperature responsive co-efficient of resistance with at least a part of the length of the path configured as a loop with two portions in side-by-side relationship, adjusting, along the length of said portions, the position of a shorting bar connected across said two portions to provide a desired value of ice-point resistance for the sensor and then fastening the shorting bar in this position. It can be seen that trimming of the sensor is performed with the resistance path secured in position on the insulating base. Thus, there is no movement of the path causing mechanical strain therein during trimming of the sensor. This provides a very significant advantage as regards the accuracy with which sensors according to the invention can be trimmed.

The loop in the resistive path may form substantially the whole length of the path, in which case the resistance of the sensor is adjustable between a maximum value with none of the path shorted out and a minimum value with substantially the whole path shorted out.

In one example of the invention, the path of conducting material is formed by winding a wire as a bifilar helix on an elongate former to provide a U-shaped loop of the wire with the arms of the U extended and coiled helically around the former in a side by side relationship. Conveniently, the wire is wound on an unglazed ceramic former and then a thin coat of glaze is applied to the winding and former to fasten the wire in position. The top surface of the wire wound on the former should be clean and free from glaze material to allow a good electrical contact to be made, and so the coat of glaze applied after winding on the wire must be sufficiently thin that it will be dragged by surface tension forces onto the ceramic surface of the former leaving bare the outer surface of the wire. A very thin residual layer of glaze material covering the wire may be permissible, however, since such a thin layer can readily be wiped or scratched away, either when positioning the shorting bar or in a separate wiping process.

Although a ceramic former is preferred, formers of other suitable materials are envisaged such as a glass with a melting point higher than that of the glaze.

In a further, bonding method, the wire is attached to the former by a ceramic cement, in which case the surface of the wire and former should be wiped clean before the cement sets so that a good electrical contact with the winding may be achieved. However, thin coats of ceramic cements may be sufficiently powdery that adequate electrical contact can be attained after setting by gently scraping the wire.

For low temperature uses of the resistance thermometer, the wire winding may be attached to the former by an epoxy resin.

Any precious or base metal known for use as the temperature responsive material in a resistance thermometer may be used for forming the conducting path.

Preferably, however, platinum is employed and thus the wire wound on the elongate former in the above embodiments may conveniently be platinum wire.

In another preferred method of making the resistance thermometer, the path of conducting material is formed by printing on the base a film of the conducting material in the shape of a double spiral. Conveniently, the film is formed of platinum.

The shorting bar may be fastened in position to provide a short circuit between the portions of the loop of the conducting path by welding the bar to the path. It will be evident that the shortening bar should be formed of a material that is suitable for welding to the material of the conducting path and provides a stable electrical contact therewith. Preferably, when a platinum conducting path is employed, the shorting bar is formed of gold. The shorting bar may alternatively also be formed of platinum.

A gold shorting bar may be thermocompression welded to the conducting path. A platinum shorting bar may also be thermocompression welded but at a higher temperature than a gold bar.

Examples of the present invention will now be described with reference to the accompanying drawings, in which:

FIG. 1 illustrates one form of resistance thermometer sensor,

FIG. 2 is a detailed longitudinal cross-section of the sensor of FIG. 1 and illustrates a method of welding a shorting bar in place, FIG. 3 illustrates an alternative form of resistance thermometer sensor and FIG. 4 illustrates a composite form of shorting bar.

FIG. 1 shows a temperature thermometer comprising a double helical coil 1 of platinum wire fixedly wound on a former 2. The coil 1 is in the form of a U-shaped loop of wire with the arms 17 of the U extended and coiled helically round the former 2 in a side by side relationship. The coil is fastened to the former, for example, by a glaze coating 11 (FIG. 2). Lead wires 3 are provided extending through longitudinal bores 18 in the former along the length of the former and are connected to the ends 19 of coil 1. A gold shorting bar 4 is provided welded across the arms of the U of the platinum coil 1 and thereby short circuiting a portion of the coil 1. The former 2 with coil 1 and shorting bar 4 is enshrouded in a protective glaze coating 5.

In one method of making the thermometer of FIG. 1, the former 2 is made of ceramic material and the platinum wire is wound on the former to produce the coil 1. The lead wires 3 are inserted up the bores 18 in the former and attached to the ends 19 of coil 1. After winding on the coil, the thin glaze coating 11 is applied to former 2. Coating 11 is sufficiently thin to be dragged by surface tension on to the surface of the ceramic former 2 leaving bare the outer surface of the coil 1 whilst securing the coil on the former. The device is then heated to a sufficient temperature and for a sufficient period to anneal the platinum wire. After cooling again, the device is brought close to a previously calibrated device of similar construction so as to be at the same temperature and the resistances of the two devices are compared on a suitable bridge circuit. The gold shorting bar 4 is connected across the side-by-side portions of the coil 1 and moved along the coil to short circuit an increasing or decreasing part of the coil until the bridge is balanced. The bar 4 is then firmly welded in this position to provide a permanent short circuit. Finally the protective glaze coating 5, is applied. Typically, the platinum wire for coil 1 is 0.025 mm. in diameter and the former 2 has a diameter of 2.5 mm.

A method of welding the shorting bar 4 in place is shown in FIG. 2. Typically, to provide the bar 4 there is employed a length of gold wire 6 with 0.05 mm. diameter. A portion of the length of wire 6 is applied across the side-by-side portions of coil 1 and, when the desired position for bar 4 is found, the wire portion is thermocompression welded to coil 1 using a welding tip 8 whose thin bottom section 9 is heated by a heavy electric current passing through it. This is used to heat the gold wire to a temperature of several hundred degrees centigrade, when, under pressure, it will form a bond with the platinum wire. When the weld is complete, a knife 10 is brought down on the two sides in turn of the welding tip 8 to cut the gold wire to length to form the shorting bar 4. It is essential for a good contact and weld to be made between the bar 4 and coil 1 that the top surface of the platinum wire before welding be clean and substantially free from any glaze material from the coating 11.

An alternative form of the resistance thermometer sensor is shown in FIG. 3. In this example, a film of platinum or a platinum rich frit is formed for example by printing, in the shape of a double spiral 13 on a dielectric substrate 12. The two arms of the double spiral are in side-by-side relationship and a gold shorting bar 14 is welded across the arms to short circuit part of the spiral in the same manner as described above for the example of FIG. 1. The spiral path may be printed on substrate 12 in any known manner, and the complete calibrated resistance thermometer may be provided with connectors and encapsulated in the usual way for such thick film circuits.

In FIG. 4 a composite form of the shorting bar is shown for a resistance thermometer sensor to be used at relatively low temperatures. This bar comprises a first layer 15 of high melting point material with a second layer 16 of relatively low melting point material. Such a composite bar may be fastened to provide a short circuit between the side-by-side portions of the path by applying sufficient heat to the high melting point layer to melt the low melting point layer for connection to the path whilst the high melting point layer remains hard. Thus the bar does not become tacky and adhere to a welding tip applying the heat. Typically, the low melting point layer may be tin-lead solder.

An important advantage of sensors according to the invention is that no heat need be applied to the thermally responsive coil of the sensor until the correct position for the shorting bar is found giving the desired value of resistance for the device at the particular temperature. Thus, errors are avoided in trimming the sensors. Also, the trimming of sensors may be performed quickly and without the need for any great skill on the part of the operator. The shorting bar welded in place on the conducting path has a low profile and is readily covered by a glazing coat or other protective encapsulation.

I claim:

1. A method of making a resistance thermometer sensor comprising the steps of providing a base of insulating material and, firmly attaching thereto a path of electrically conducting material with a temperature responsive coefficient of resistance, with at least a part of the length of the path configured as a loop, with two portions in side-by-side relationship and adjusting, along the length of the said portions, the position of a shorting bar connected across said two portions to provide a desired value of ice point resistance for the sensor and then fastening the shorting bar in this position.

2. A method as claimed in claim 1 wherein the base is formed as an elongate cylindrical former and the path of conducting material is provided by forming a bifilar helix of wire on the former and attaching it thereto in the configuration of a U-shaped loop with the arms of the U extended and coated helically around the former in side-by-side relationship.

3. A method as claimed in claim 2 wherein the helix of wire is formed on an unglazed ceramic former and then a coating of glaze is applied to the helix and former to secure the wire to the former, the glaze coating being sufficiently thin to leave the outer surface of the wire substantially free from glaze material.

4. A method as claimed in claim 2 wherein the wire is cemented to the former.

5. A method as claimed in claim 1 wherein the path of electrically conducting material is formed by printing on the base a film of the material in the shape of a double spiral.

6. A method as claimed in claim 1 wherein the shorting bar is fastened in position by welding the bar to the path.

7. A method as claimed in claim 1 wherein the shorting bar comprises a first layer of high melting point material with a second layer of low melting point material and wherein the bar is fastened in position by applying sufficient heat to the high melting point layer to melt the low melting point layer for connection to the path whilst the high melting point layer remains hard.

8. A method as claimed in claim 1 wherein a portion of a length of wire is adjusted in position shorting across the loop portions, is thermocompression welded in position and is then cut to length to provide the shorting bar.

9. A method as claimed in claim 1 wherein, after providing the path firmly attached to the base, the sensor is brought close to another sensor so that they are at substantially the same temperature, said other sensor being previously calibrated and trimmed to have said desired value of ice point resistance, then the resistances of the two sensors are compared and the positioning of the shorting bar is adjusted until the resistances are substantially equal, before fastening the shorting bar in position.

10. A method of manufacturing a resistance thermometer sensor comprising the steps of providing an elongate cylindrical ceramic former, forming a bifilar helix of platinum wire in a U-shaped loop with the arms of the U extended and coated helically around the former in a side-by-side relationship, applying a coating of glaze to the helix and former to secure the wire to the former, the glaze coating being sufficiently thin to leave the outer surface of the wire substantially free from glaze material, bringing the sensor close to another sensor so that they are at substantially the same temperature, said other sensor being previously calibrated and trimmed to have a desired ice point resistance, comparing the resistances of the two sensors, adjusting along the length of said arms of wire, the position of a portion, connected across the arms, of a length of gold wire, until the resistances of the two sensors are substantially equal, thermocompression welding the portion of gold wire in position and then cutting the length of gold wire to leave said portion as a shorting bar connected across said arms.

* * * * *